May 11, 1926. 1,583,858
E. SCHNEIDER
GUN MOUNTING LAYING AND SIGHTING ARRANGEMENT FOR ARTILLERY ON AEROPLANES
Filed March 14, 1923 16 Sheets-Sheet 1
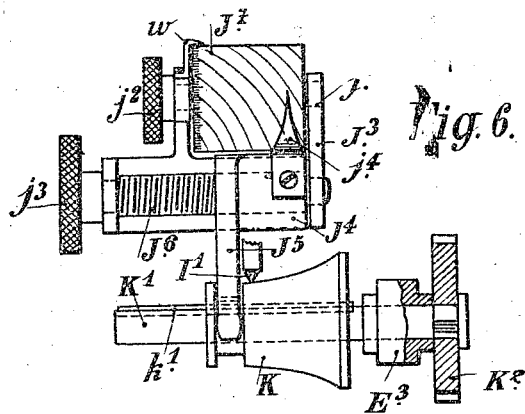
Fig. 6.
Fig. 1.
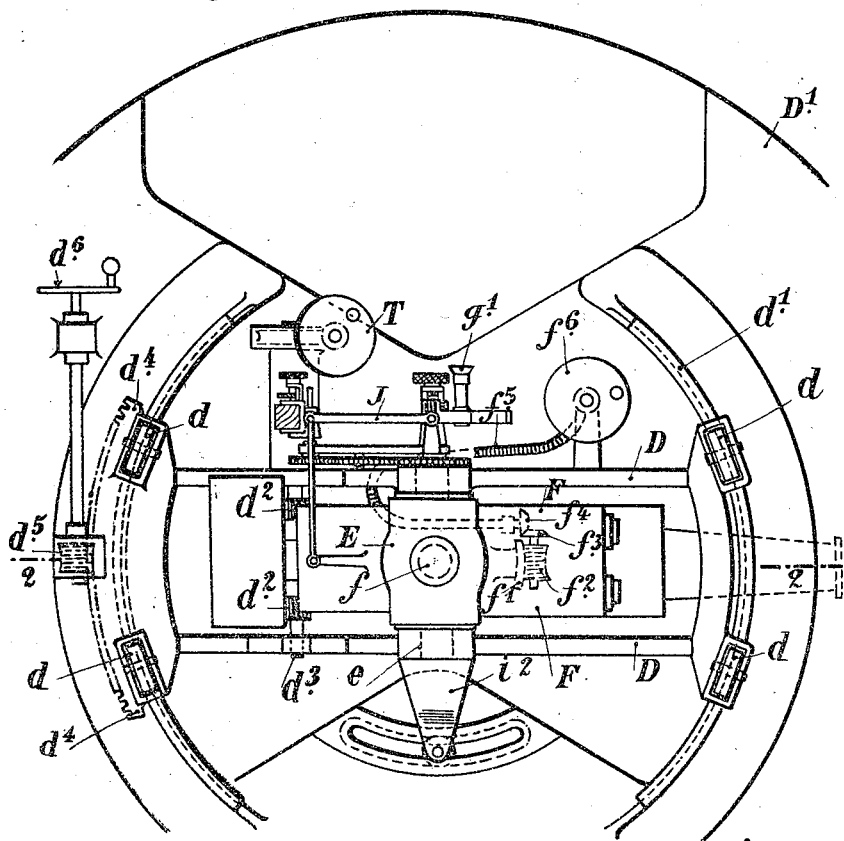

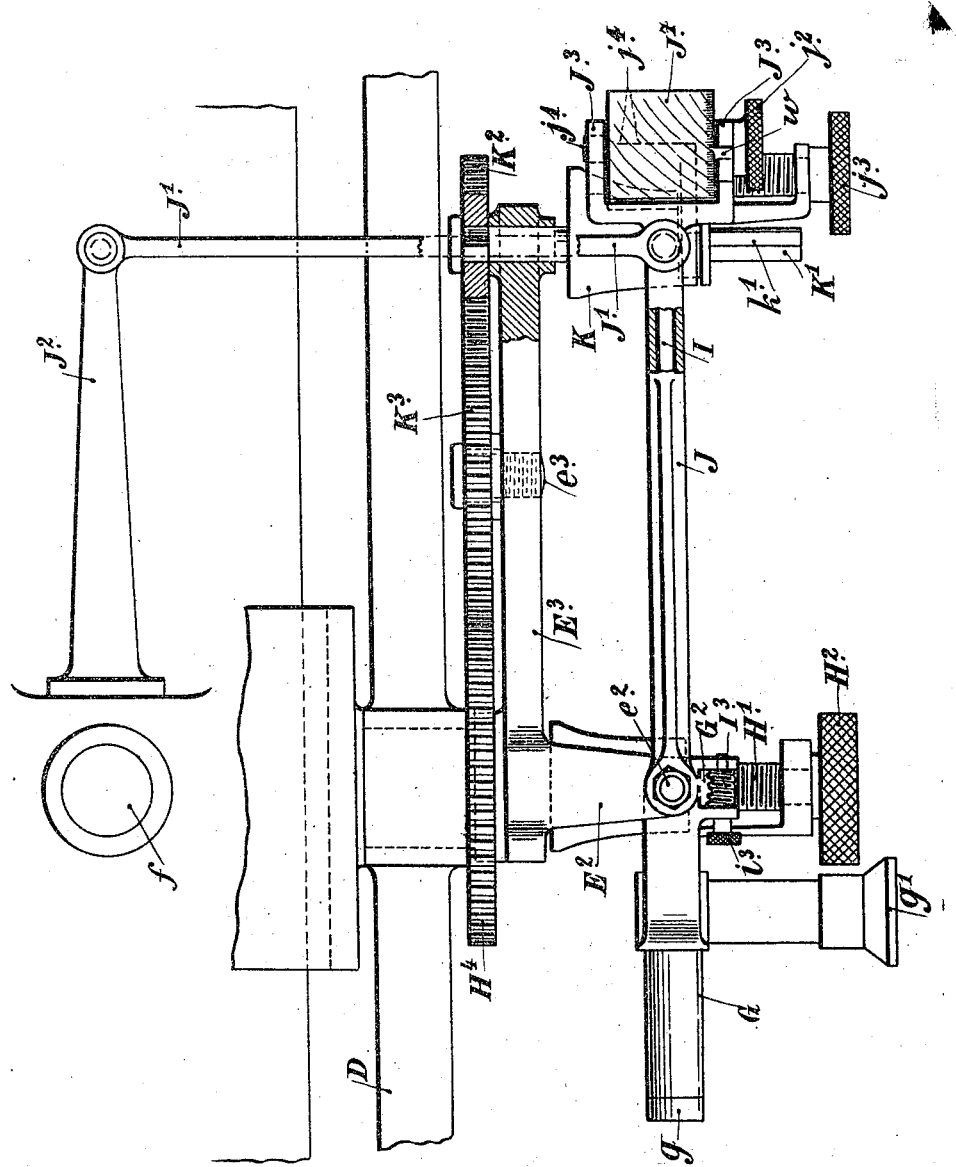

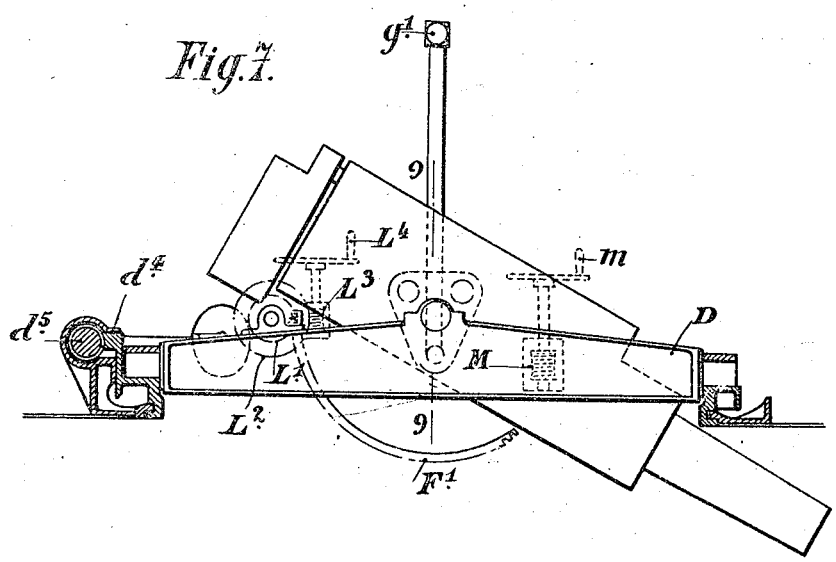
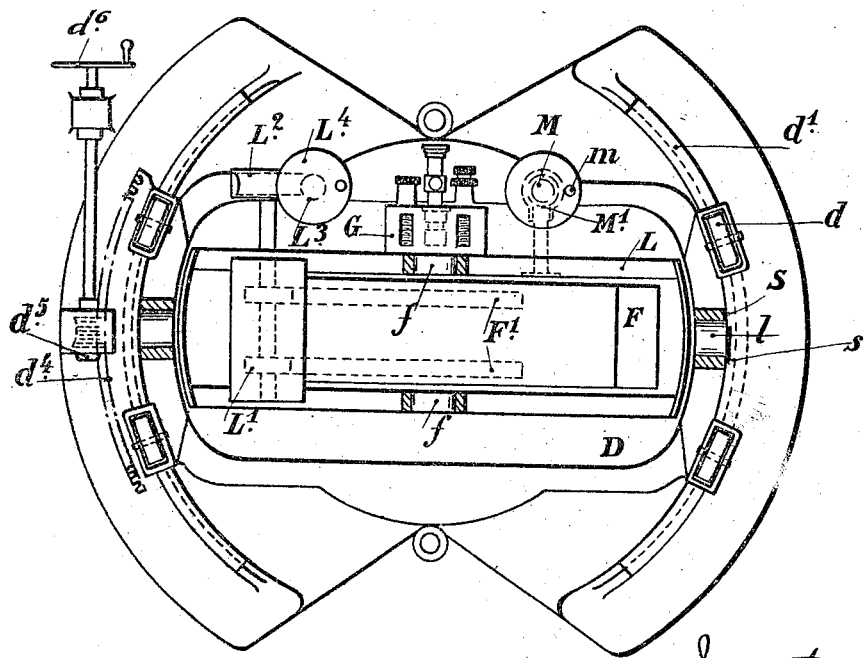

May 11, 1926.  1,583,858
E. SCHNEIDER
GUN MOUNTING LAYING AND SIGHTING ARRANGEMENT FOR ARTILLERY ON AEROPLANES
Filed March 14, 1923  16 Sheets-Sheet 7

May 11, 1926. 1,583,858
E. SCHNEIDER
GUN MOUNTING LAYING AND SIGHTING ARRANGEMENT FOR ARTILLERY ON AEROPLANES
Filed March 14, 1923  16 Sheets-Sheet 8

Inventor
Eugene Schneider
By
Mauro, Cameron, Lewis & Kirkam
attorneys

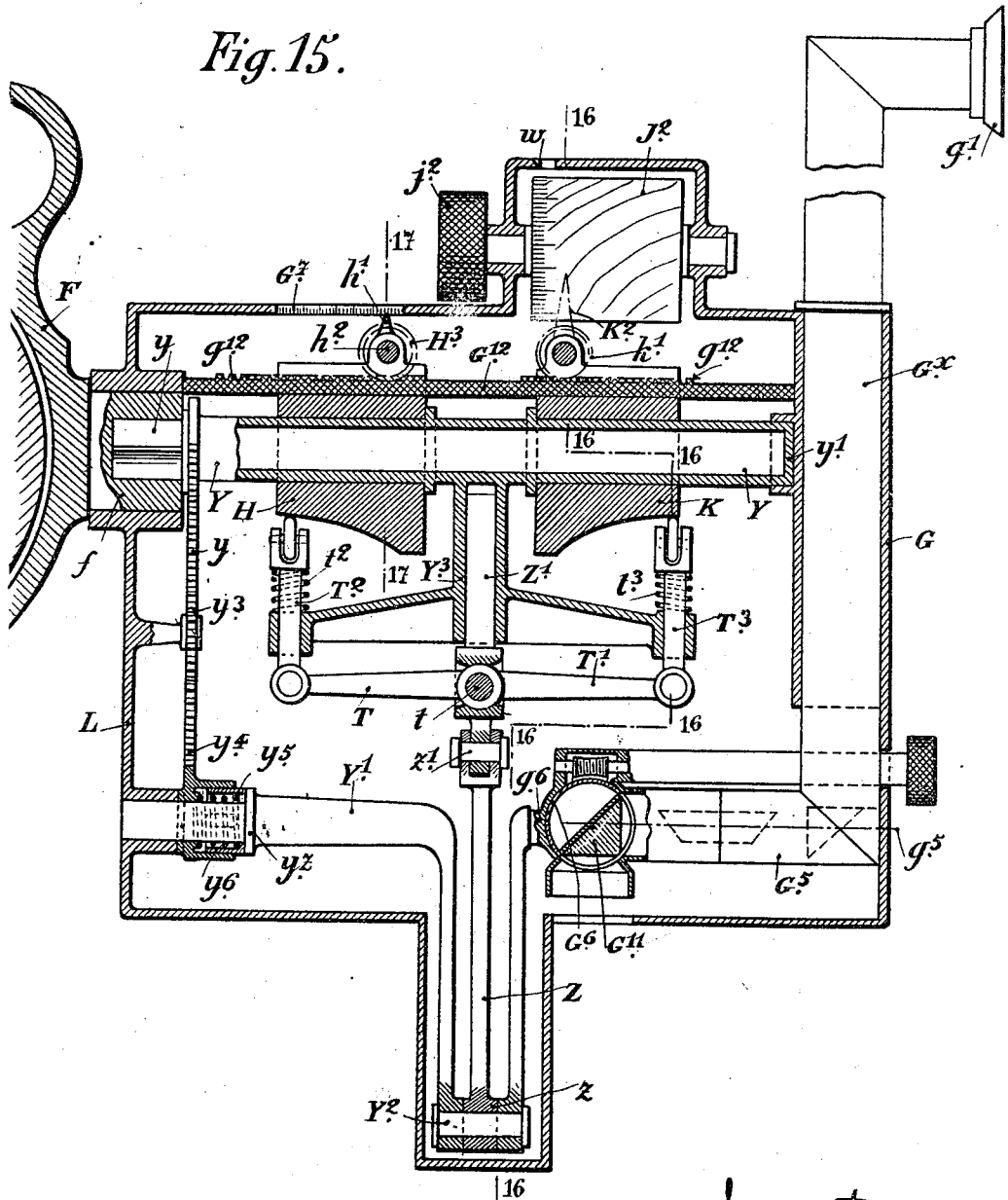

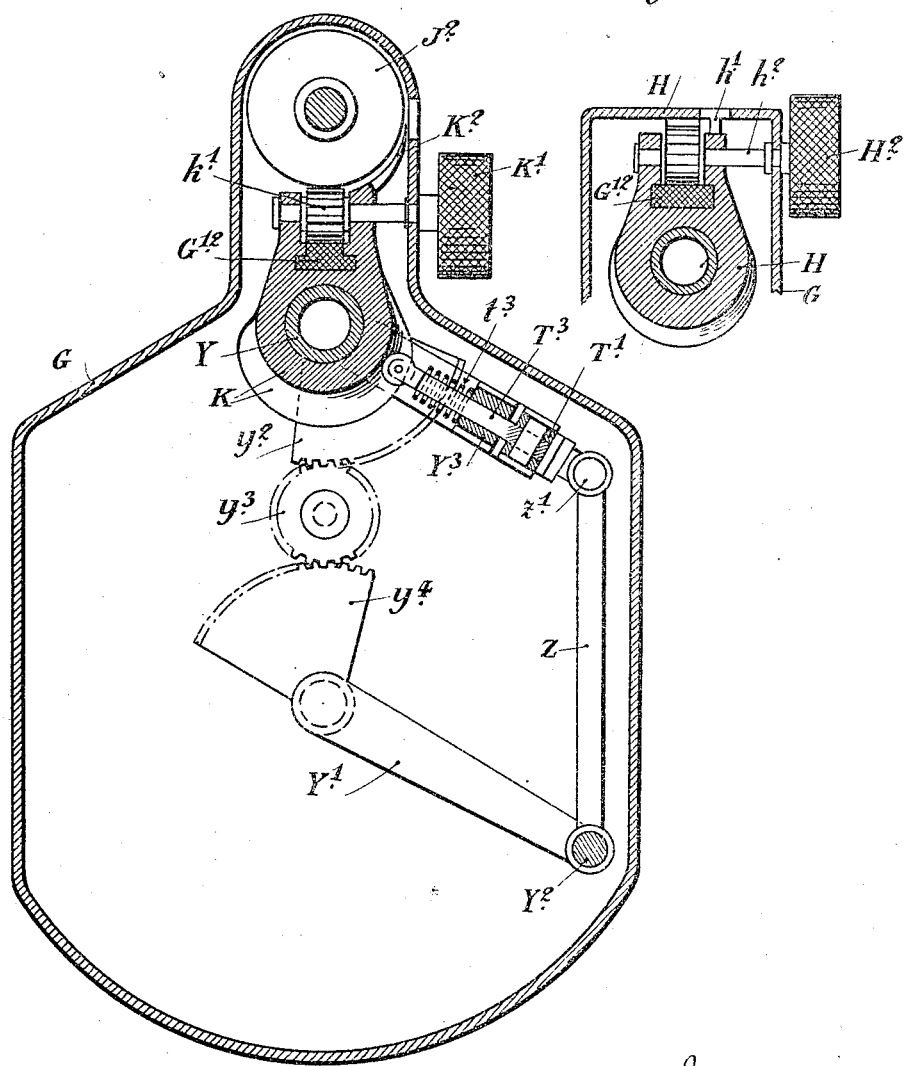

May 11, 1926. 1,583,858
E. SCHNEIDER
GUN MOUNTING LAYING AND SIGHTING ARRANGEMENT FOR ARTILLERY ON AEROPLANES
Filed March 14, 1923 16 Sheets-Sheet 13

Inventor
Eugene Schneider
By Mauro, Cameron, Lewis & Massam
Attorneys

May 11, 1926.  
E. SCHNEIDER  
1,583,858  
GUN MOUNTING LAYING AND SIGHTING ARRANGEMENT FOR ARTILLERY ON AEROPLANES  
Filed March 14, 1923  16 Sheets-Sheet 15

Inventor  
Eugene Schneider  
By Mauro, Cameron, Lewis & Massau  
attorneys

May 11, 1926.
E. SCHNEIDER
1,583,858
GUN MOUNTING LAYING AND SIGHTING ARRANGEMENT FOR ARTILLERY ON AEROPLANES
Filed March 14, 1923    16 Sheets-Sheet 16
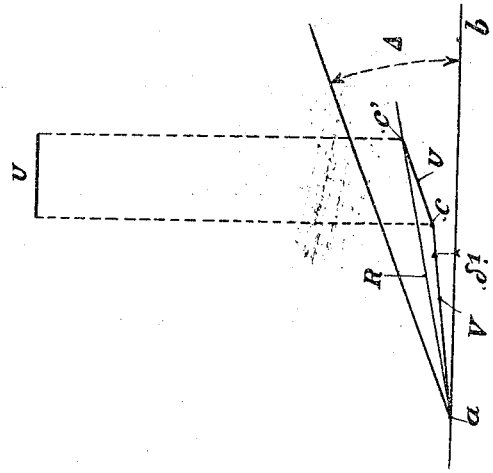
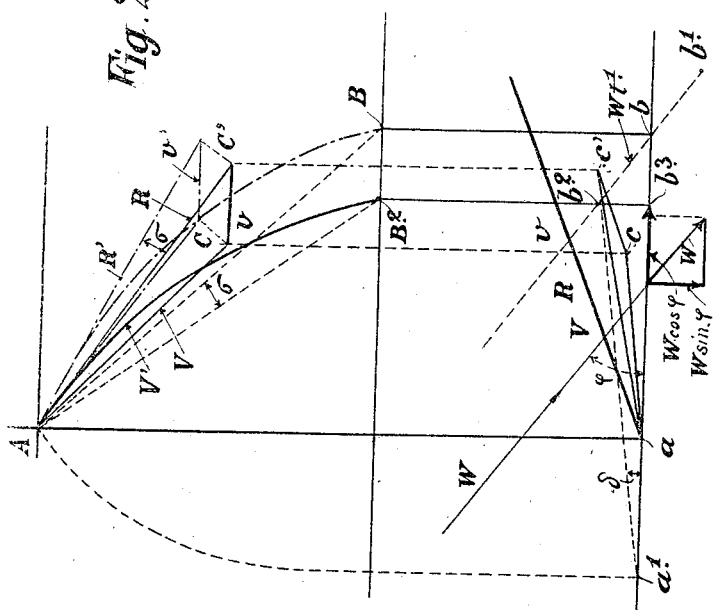
Inventor
Eugene Schneider
By Mauro, Cameron, Lewis & Kirkam
attorneys.

Patented May 11, 1926.

1,583,858

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

GUN-MOUNTING LAYING AND SIGHTING ARRANGEMENT FOR ARTILLERY ON AEROPLANES.

Application filed March 14, 1923. Serial No. 625,041.

The subject of the present invention is a combined gun mounting laying and sighting mechanism for artillery armaments installed on aeroplanes.

In order to clearly describe the mechanism constituting the subject matter of the present invention, its method of operation, and the nature of the problem presented in controlling the fire of artillery mounted on aeroplanes and directed against a stationary or moving objective, it will be assumed that, during firing, the aeroplane remains stable, that it flies at a constant speed and at an invariable altitude, pursuing a fixed course, such that it passes approximately through the vertical axis of the objective.

In order to more clearly understand this invention drawings depicting embodiments of the same have been annexed as a part of the specification, but it is to be expressly understood that the drawings are for purposes of illustration only and are not to be considered restrictive of the scope of the invention, reference being had to the appended claims for this purpose. In said drawings:—

Figs. 1 to 6 inclusive show an embodiment of the invention, which comprises a gun mounting constructed according to United States patent application Ser. No. 581,835 filed Aug. 14, 1922.

Fig. 1 is a plan of the complete mounting, laying mechanism and sighting apparatus.

Fig. 3 is a detail sectional elevation of a detail along the line 3—3 of

Figure 2:
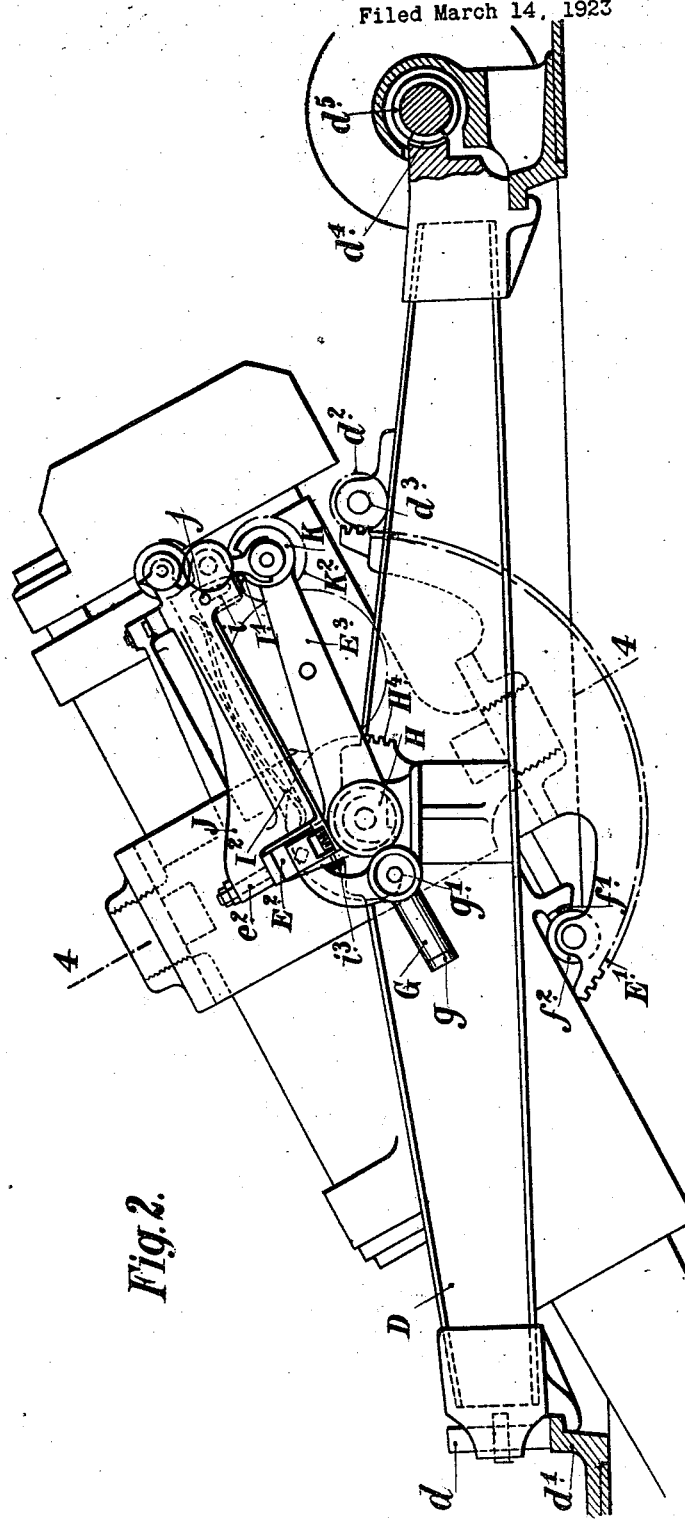
Fig. 2 is a sectional elevation on a larger scale along the line 2—2 of Fig. 1.
Figure 3:
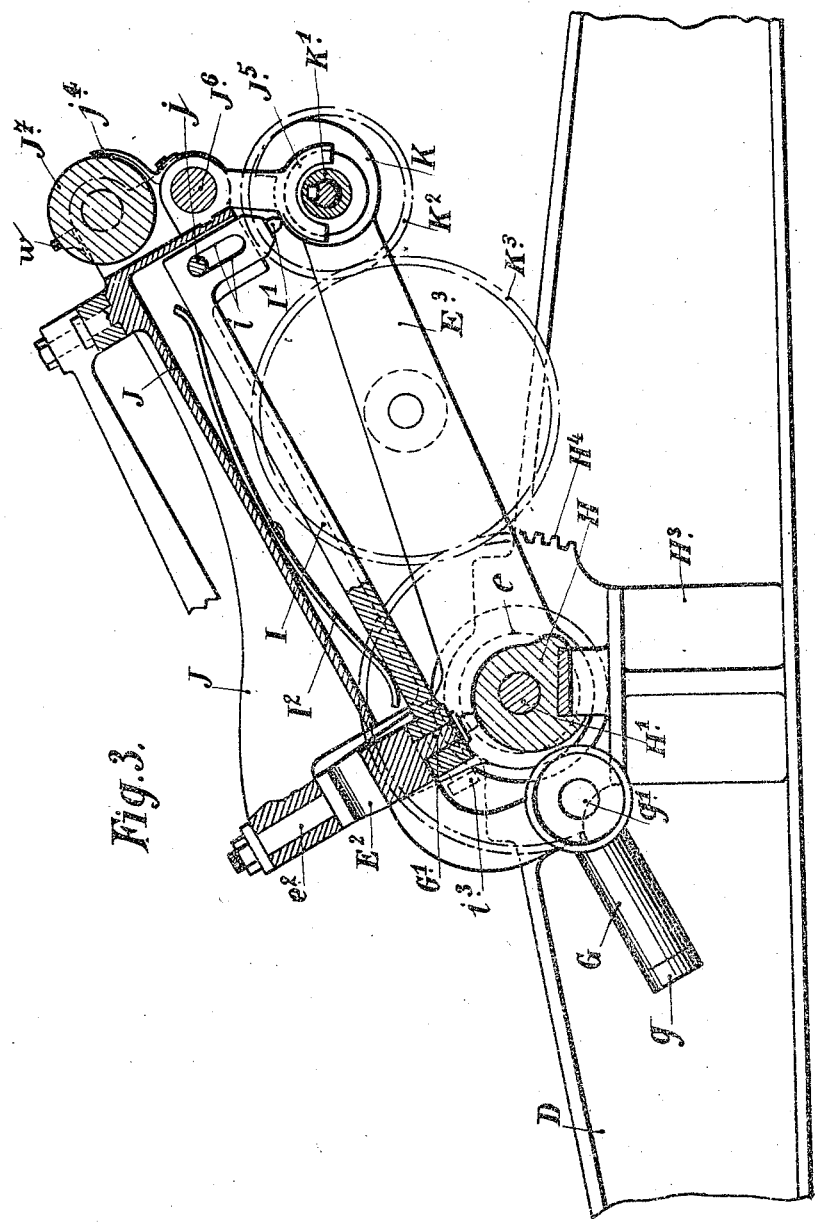
Figure 4:
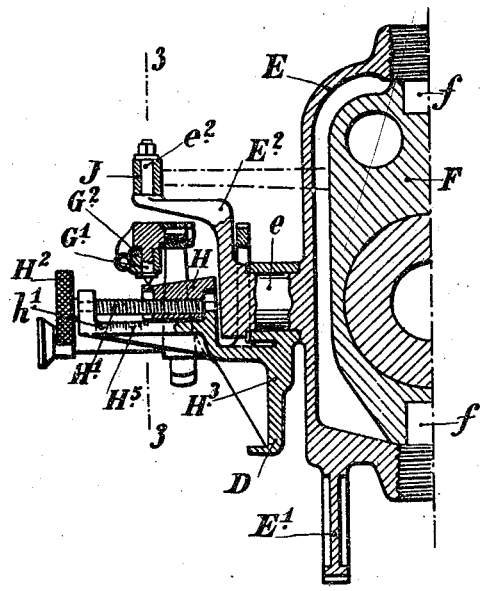

Fig. 4, which is a half sectional elevation along the line 4—4 of Fig. 2.

Fig. 5 is a partial plan of a detail of the arrangement of the sighting apparatus.

Fig. 6 is a partial elevation of such detail corresponding to Fig. 5.

Figure 9:
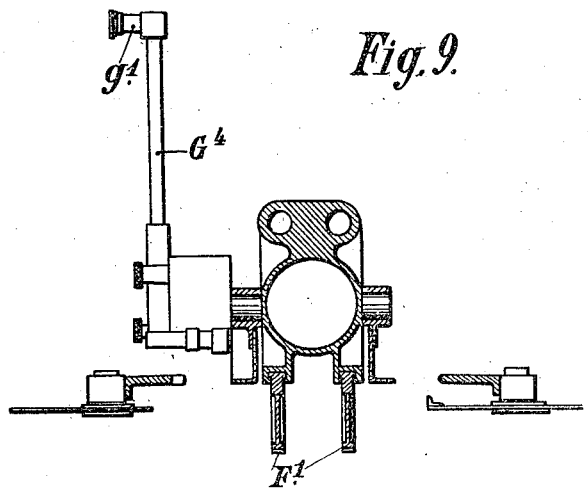

Figs. 7 to 9 inclusive illustrate preliminary adjusting and correcting mechanism in which Fig. 7 is a longitudinal elevation of the whole.

Fig. 8 is a corresponding plan.

Fig. 9 is a section along the line 9—9 of Fig. 7.

Figs. 10 to 14 inclusive illustrate sighting means and associated mechanism in which—

Figure 10:
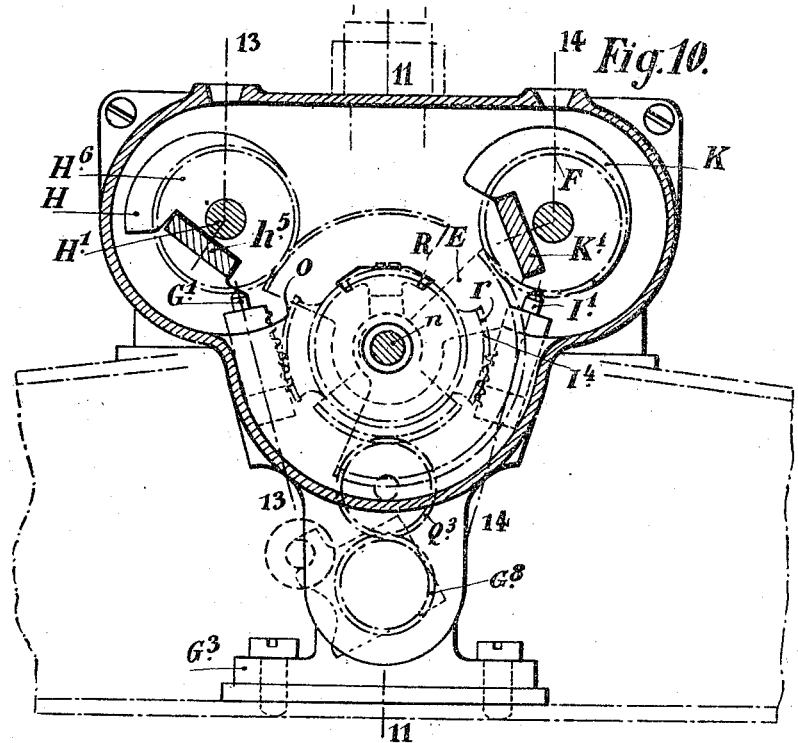

Fig. 10 is an elevation showing the correcting members, one of the covers of the enclosing casing being assumed to be removed.

Figure 11:
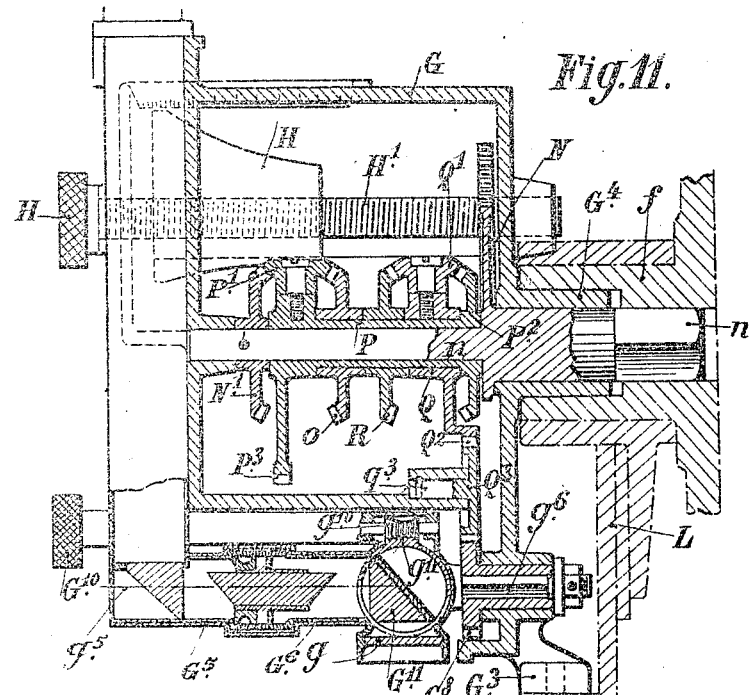

Fig. 11 is a sectional elevation along the line 11—11 of Fig. 10.

Figure 12:
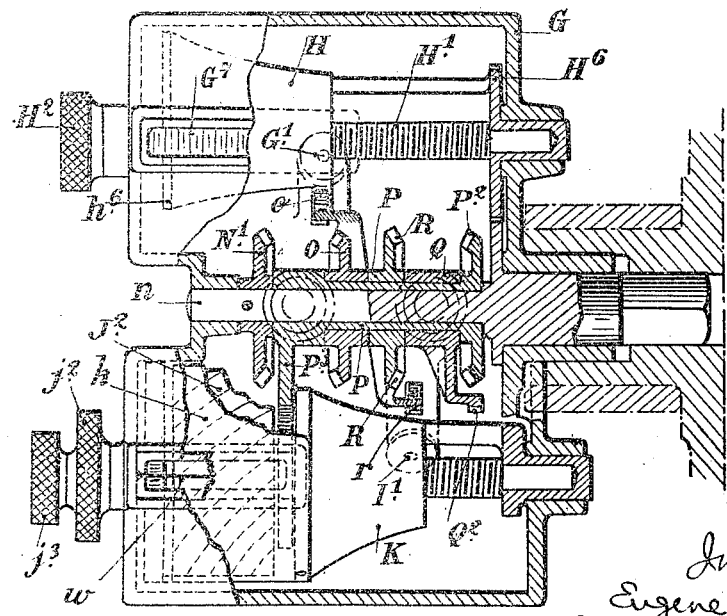

Fig. 12 is a sectional plan corresponding to Fig. 10.

Figure 13:
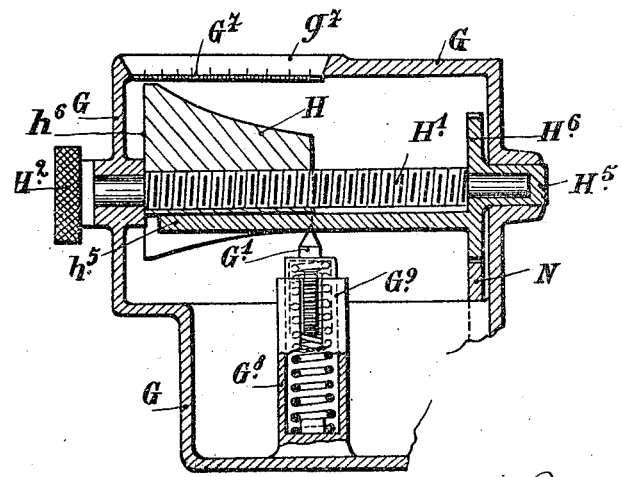
Figure 14:
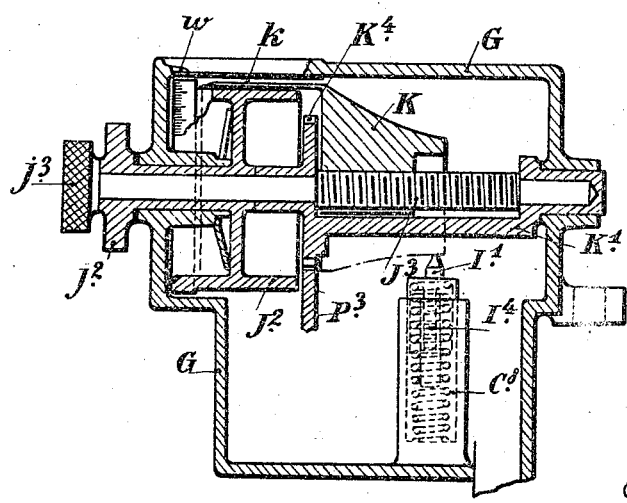

Figs. 13 and 14 are partial sectional plans respectively along the lines 13—13 and 14—14 of Fig. 10.

Figs. 15 to 17 inclusive illustrate another embodiment of the invention in which—

Fig. 15 is a sectional elevation along a plane passing through the axis of the trunnion of the cradle.

Fig. 16 is a sectional elevation along the line 16—16 of Fig. 15, the parts being in different positions in Figs. 15 and 16.

Fig. 17 is a detail section along the line 17—17 of Fig. 15.

Figs. 18 to 21 inclusive show another embodiment of the invention in which—

Figure 18:
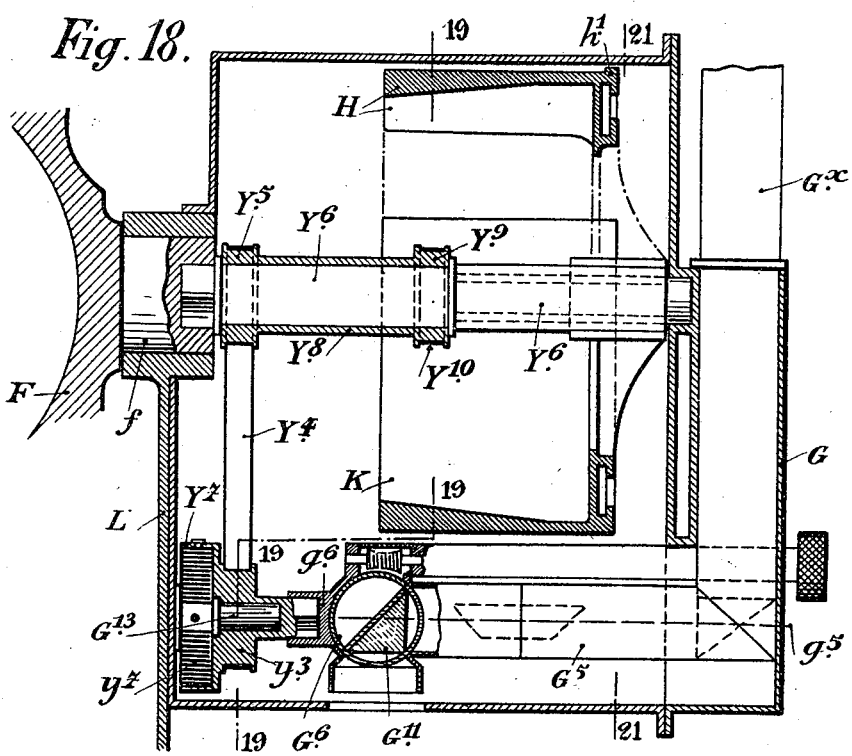

Fig. 18 is a section along the axis of the trunnion of the cradle and the axis of the sighting apparatus.

Figure 19:
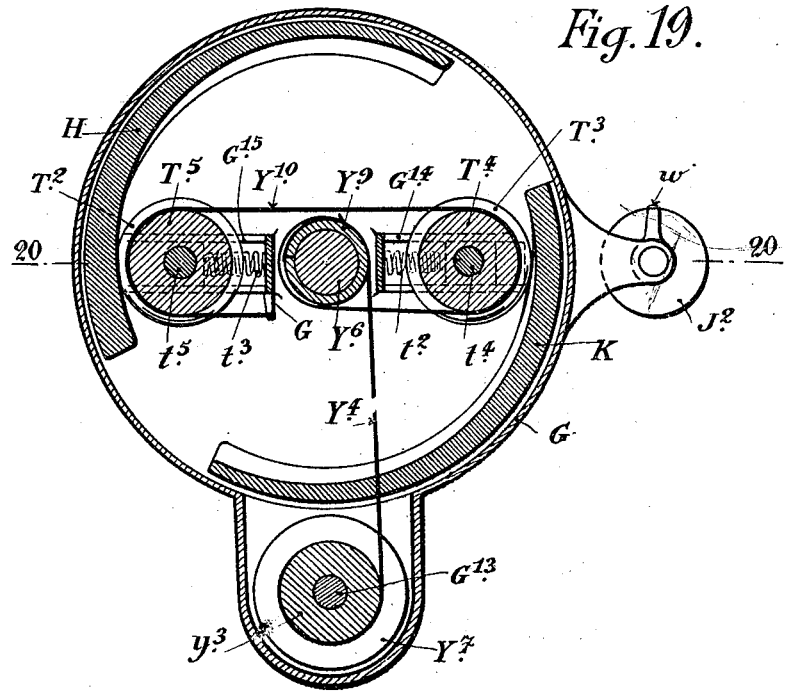

Fig. 19 is a sectional elevation along the line 19—19 of Fig. 18.

Figure 20:
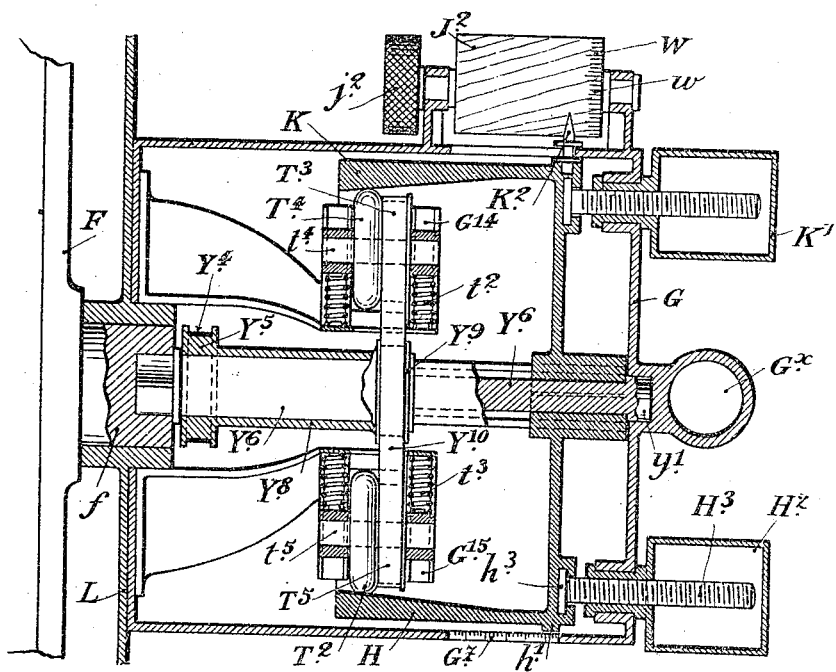

Fig. 20 is a sectional plan along the line 20—20 of Fig. 19.

Figure 21:
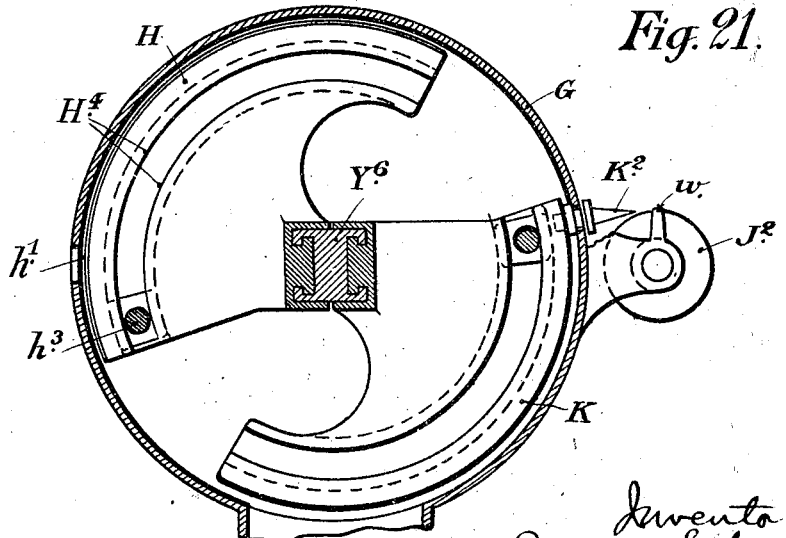

Fig. 21 is a detail sectional elevation along the line 21—21 of Fig. 18.

Figs. 22 to 26 inclusive are diagrammatic views illustrating the manner in which various calculations are derived in carrying out the invention.

It will be assumed firstly, for greater simplicity, that the fire is to be effected during a flight in a calm atmosphere, in other words without requiring corrections in laying to compensate for the action of wind.

Figure 22:
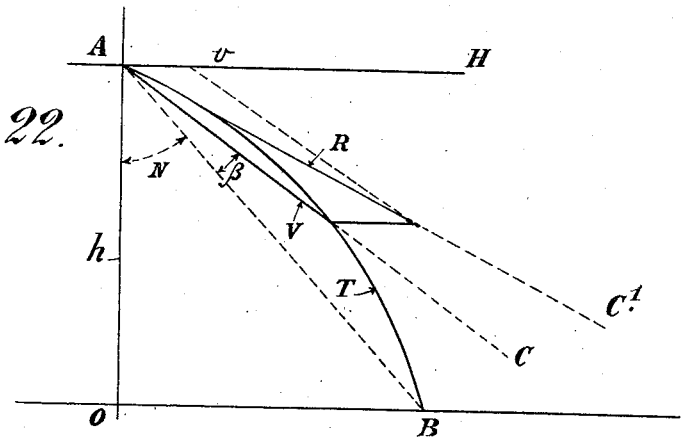

In diagrammatic Fig. 22—

$v$ represents the speed of the areoplane,
$h$ the constant altitude of flight,
B the position of the objective,
A the position of the aeroplane at the instant of firing.

AC is the correct direction to give to the gun to hit the objective.

V is the initial velocity of the projectile.

If this velocity is plotted along AC, whilst $v$ is plotted along the horizontal, by the parallelogram of the velocities, a resultant R is obtained directed along $AC^1$, which is the actual muzzle velocity of the projectile.

T is the trajectory of the projectile, which is tangential to R; AB is the line of sight, which forms with the direction AC of the axis of the gun, the angle of tangent elevation β.

Practically, it is of consequence to know, at each instant, the angle β which it is necessary to give to the gun relatively to the line of sight AB directed on the objective. Well, it is conceivable that, knowing the velocities $v$ and V and, in consequence the resultants R, the corresponding value of β for a given resultant of direction AC¹ can be determined in advance. By starting, in effect, from a given direction of R, it is easy, knowing $v$ which is horizontal and V, to determine the value of R and, consequently, the direction of AC, and the angle which it makes with the line of sight AB. Definitely, for a determined direction AB of the line of sight, the value β to which the axis of the gun must be diverted relatively to the said direction will always be known. This divergence will be able to be effected automatically, by the interposition, between the elevating mechanism of the gun and the sighting apparatus, of a suitably arranged cam which would have a profile corresponding to the altitude of flight $h$. The several cams, for the different altitudes, may be combined on a longitudinally displaceable conoidal cam, such displacement enabling always the cam surface corresponding to the altitude of flight at which the fire is effected to be brought into action.

To fire under the above hypotheses and in a calm atmosphere, it will suffice, to recapitulate, to maintain the aeroplane in the desired direction, in other words to maintain its longitudinal axis in the vertical plane passing through the objective B; the gun itself will be maintained directed in the same plane.

The arrangement, which will be described later, comprises, as will be seen, a conoidal cam provided, as has been stated, for the purpose of ensuring for the gun the suitable tangent elevation β corresponding to a given altitude of flight $h$ and in a direction AB of the line of sight, forming the angle N with the vertical.

Most frequently, firing must be effected with an aeroplane subjected to the action of a wind of variable velocity and direction. However, in order to provide corrections in elevation and direction to which it is necessary to subject the gun, it will be assumed that the direction and velocity of the wind are constant during the flight in the course of which firing is to be effected.

In order that the corrections corresponding to a determined direction of wind can be correctly effected, the most simple plan would appear to be for the aeroplane, during its flight, itself to preserve a constant direction, in order that the angle it makes with the direction of the wind does not vary; in other terms, that the line of flight of the aeroplane be a straight line.

For the determination of the corrections required by the wind, the two following considerations will be started from:—

1. That the projectile is fired with a velocity which is the resultant of the muzzle velocity V and of the speed $v$ of the aeroplane, as if the fire were effected in a still atmosphere.

2. That the atmosphere, and all it contains, displaces itself en bloc, relatively to the ground with the velocity W of the wind; by thus operating, the corrections for wind are slightly increased, owing to the fact that the lower layers of air displace themselves less rapidly than the upper layers.

Figure 23:
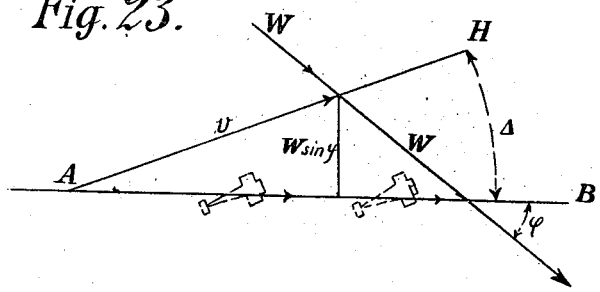

In diagrammatic Fig. 23, AH represents in a plan the direction of the axis of the aeroplane, i. e. of its line of flight in the case where there is no wind; assuming a wind blowing along W, AB represents the actual line of flight of the aeroplane determined by the composition of its own velocity $v$ and of the said velocity W.

During the flight, the axis of the aeroplane will displace itself parallel to the direction AH and its centre along the direction AB. If therefore, it is desired to fire on an objective B, situated in the vertical plane of AB, it is first of all necessary to displace the gun and the line of sight, which are normally directed along the axis of the aeroplane or parallel to the direction AH, through an angle, relative to the longitudinal axis of the aeroplane equal to the angle HAB or $\triangle$ (called "drift"), which angle can be determined by the relation $$v \sin \triangle = W \sin \varphi$$

φ being the angle assumed constant that the direction of the wind makes with the vertical plane of the actual line of flight or plane of the course AB.

The line of sight being directed on the objective (i. e. in the plane of the course), it remains to deviate the gun in direction of the desired angle in order to take into account the speed of the aeroplane and the action of the wind.

Figure 24:
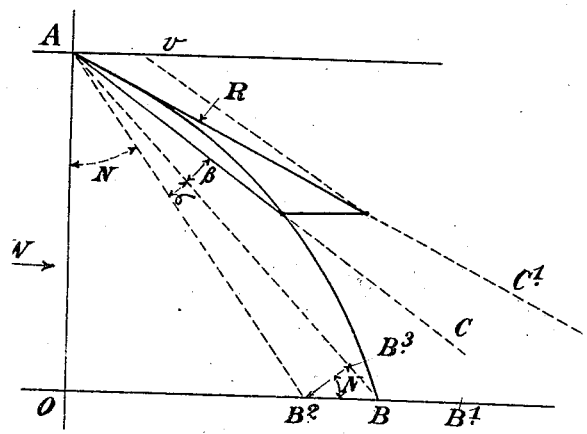

In diagrammatic Fig. 24, as in Fig. 22, B denotes the objective to be attained by a projectile fired from the aeroplane A flying at the constant altitude and at a constant speed $v$. This objective would be in the absence of any wind, effectively attained, the gun being directed along AC, i. e. making with the normal line of sight, the angle δ. If it is assumed that the wind, of a velocity W, instead of having a direction oblique relatively to the plane of the course of the aeroplane, is a following wind in the same plane, with the same velocity W, the point on the ground which will be attained by the projectile, according to the considerations mentioned above, will no longer be B; the projectile will fall at a point $B^1$, such that $BB^1 = Wt$, $t$ being the duration of the flight of the projectile.

In order to take this deviation into account, it will be necessary therefore previously to divert the axis of the gun relatively to the line of sight through an angle $\sigma$ such that $B^2B = Wt^1$; $t^1$ being the duration of the flight $AB^2$.

If from $B^2$ is drawn a perpendicular $B^2B^3$ on AB, it gives:—

$$\text{sine } \sigma = \frac{B^2B^3}{AB^2} = \frac{BB^2 \cos N}{AB^2} = \frac{Wt^1 \cos N}{AB^2}$$

If by $V^1$ is designated the ratio $$\frac{AB^2}{t^1}$$

it gives:

$$AB^2 = V^1 t^1$$

and consequently:

$$\text{sine } \sigma = \frac{Wt^1 \cos N}{V^1 t^1} = \frac{W \cos N}{V^1}$$

In reality, the correction $\sigma$ will generally have to be made with a wind acting obliquely on the aeroplane, as has been assumed in the diagram Fig. 23.

Diagrammatic Fig. 25 corresponds to this assumption, and comprises an elevation and the corresponding plan. In the plan, $ab$ is the trace of the plane of the course of the aeroplane on the horizontal plane of the objective.

R designates the resultant of the velocities V and $v$ of the projectile and aeroplane in the air; W is the velocity of the wind blowing horizontally in the direction indicated, i. e. the speed of displacement of the air relatively to the ground.

In the absence of any wind, the projectile would fall at $b$. In the event of wind, if the position of the axis of the gun is not corrected, the projectile would fall at a point $b^1$ such that $bb^1 = Wt$.

If therefore it is desired to compensate for the action of the wind in order to attain the point $b$, it is necessary to displace the resultant $R^1$ relatively to the line of sight directed on this point through an angle $\sigma$ in elevation and an angle $\delta$ in direction, in such a manner that the point $b^2$, which would thus be attained if there were no wind, is distant from $b$, by the amount $b^2 = Wt^1$ ($t^1$ being the duration of the flight of the projectile corresponding to $B^2$).

In order to determine $\sigma$ it suffices to remark $BB^2 = bb^3 = Wt^1 \cos \varphi$.

It will have, according to the preceding relation, been established $$\text{sine } \sigma = \frac{BB^2 \cos N}{V^1 t^1} = \frac{Wt^1 \cos \varphi \cos N}{V^1 t^1} = \frac{W \cos \varphi \cos N}{V^1}$$

($V^1$ varies slightly with the angle N but can be assumed constant).

The arrangement will comprise, for a wind of determined velocity W, a cam interposed between the elevating mechanism of the gun and the sighting apparatus, such that in directing the latter on the objective, the gun is automatically diverted through the corresponding angle $\sigma$. In practice, a continuous conoidal cam will be used of which the various sections will be placed in operation in accordance with the value of the variable factor $W \cos \varphi$.

The angle $\delta$ is formed by the offset $a^1 b^2 b^3$ on the horizontal plane of the triangle $ab^2b^3$. It is found:

$$tg\ \delta = \frac{b^2b^3}{a^1b^3} = \frac{b^2b^3}{AB^2} = \frac{b^2b \sin \varphi}{AB^2} = \frac{Wt^1 \sin \varphi}{AB^2}$$

since $AB^2 = V^1 t^1$, $$tg\ \delta = \frac{Wt^1 \sin \varphi}{V^1 t^1} = \frac{W \sin \varphi}{V^1}$$

It has been seen that $v \sin \Delta = W \sin \varphi$ whence it follows that:

$$tg\ \delta = \frac{v \sin \Delta}{V^1}$$

Now $v$ is constant. It may likewise be admitted that in practice, $V^1$ is constant; under these conditions, it is permitted to admit, for a determined wind, a constant correction which is calculated with the transverse component $W \sin \varphi$ of the wind.

Knowing $\delta$ and its horizontal projection, it is easy to deduce therefrom the position which the gun must occupy in direction, in the case of oblique wind; for each position of the resultant R (the value of R depending on the position of the gun).

Referring to diagrammatic Fig. 26 there is represented in plan, along the lines $ac$ and $ac'$, the respective positions of the gun and of the resultant R, of V and of $v$, relatively to the plane of the course and to the longitudinal axis of the aeroplane, in the case of oblique wind.

(In this figure, $v$ is parallel and equal to the horizontal projection of the speed of the aeroplane.) The correction in direction which is necessary definitely to give to the gun, or the angle which the latter must make with the vertical plane of the course, will be represented, in horizontal projection, by $\delta^1$ (Fig. 26).

Referring to Figs. 1 to 6, inclusive, the mounting comprises an elongated frame D, running by rollers $d$ on a circular rolling track $d^1$ provided on the crown of a pedestal or platform D¹ or on the lower framing of the aeroplane.

In the longitudinal sides of this frame, pivots, by trunnions $e$, a second frame E in which the cradle F of the gun in turn pivots by trunnions $f$, the axis of which is perpendicular to that of the trunnions $e$ and to the axis of the gun.

Laying as regards elevation is obtained by the pivoting of the frame E about the axis of the trunnions $e$, the said frame carrying for this purpose toothed sectors E¹, which gear each with a pinion $d^2$ carried by a shaft $d^3$ journalled in bearings fast on the longitudinal sides of the frame D. This shaft is actuated by a gear operated by means of a hand wheel T. The drift deviation $\Delta$ is given to the frame D and to the sighting apparatus carried by the latter, by a suitable mechanism comprising, for example, on the said frame, a worm sector $d^4$, which gears with a worm $d^5$ the shaft of which is journalled in bearings secured to the framing and which can be actuated by a hand wheel $d^6$. The correction in direction $\delta^1$ which the gun must receive is imparted to the cradle F by means of a pivotal motion about the trunnions $f$ effected by means of a suitable mechanism comprising, for example, a worm sector $f^1$ formed on the cradle F and gearing with a worm $f^2$ journalled in bearings carried by the toothed sectors E¹ (Fig. 2) the said worm itself carrying a bevel pinion $f^3$ gearing with a bevel pinion $f^4$ the shaft of which is carried by a bearing fast on one of the sectors E¹, and is actuated by means of a flexible shaft $f^5$ driven by a hand wheel $f^6$.

The arrangement enables to be produced, between the sighting apparatus and the axis of the gun, a deviation in elevation on the one hand of the angle of elevation B, on the other hand of the angle $\sigma$ corresponding to the action of the wind, the value of which is, as has been seen, given by the formula:

$$\text{sine } \sigma = \frac{W \cos \varphi \cos N}{V^1}$$

These deviations are effected automatically, by maintaining the sighting apparatus directed on the objective. For this purpose, this sighting apparatus G, of which $g$ is the optical objective and $g^1$ the eye piece, is carried by a support bar I guided in an arm of box section J, which can pivot about a spindle $e^2$ fast on a bracket E² protruding from one of the trunnions $e$ of the frame E (Fig. 4).

The sighting apparatus is supported, at one end of the bar I, by means of a support X provided in any suitable manner with a pointed pivot stud G¹, which bears constantly on the elevation correction conoidal cam H. The opposite end of the bar I is guided, on a pin $j$ carried by the arm J, by a slot-way $i$ having its centre of curvature at the point of the stud G¹. This end of the bar terminates in a point I¹, which bears constantly on the conoidal cam K serving to impart the correction of elevation due to wind. Bearing of the bar I on the conoidal cams H and K is ensured by the influence of a spring I² secured to the crown of the guide box J of the said bar.

The whole, consisting of the sighting apparatus, the supporting bar I and the guide arm J, is displaceable with the pivot $e$; the arm J is connected, by a connecting rod J¹, to one end of an arm J², the other end of which is fast with the cradle F. This connection allows the gun and the sighting apparatus being trained together as a whole. Moreover, the articulation of the sighting apparatus, by the pivot G¹, to the bar I, enables nevertheless a deviation in direction between the line of sight and the axis of the gun. The provision for this deviation is necessary in order to take into account the deviation in direction $\delta^1$ cited above.

The conoidal cam or camoid H is constructed as a nut moving on a screw H¹, capable of being actuated by a knurled knob H² and journalled in a support H³ fast on one of the longitudinal sides of the frame D. The nut H is precluded from turning by its guidance on a scale bar H⁵, which is graduated in altitudes of flight $h^1$.

The conoidal cam or camoid K, for the correction of elevation of the gun due to the action of wind, is constructed to effect a displacement of the point I¹ as a function of $$\frac{W \cos \varphi \cos N}{V^1}.$$

The said conoidal cam K is movable longitudinally along a feather $k^1$ of a shaft K¹, which can turn in an arm E³ fast with the bracket E² and the trunnion $e$ of the frame E. The said shaft carries a pinion K² gearing with a spur wheel K³ carried by an intermediate spindle keyed to the arm E³, the wheel K³ gearing in turn with a stationary toothed sector H⁴ rigidly fast on the support H³, which is itself fast on the frame D.

In a fork J⁶, formed at the end of the arm J is journalled an axle $j^1$ supporting a drum J⁷; on this drum are traced the curves of $\psi$ (angle of the direction of the wind with the plane of the course) such that the displacement of a pointer $j^4$ for determined values of W and $\psi$, represents the value $$\frac{W \cos \varphi}{V^1}.$$

The drum, which carries on its edge the values of W, can be actuated by means of a milled head $j^2$, which enables the graduation corresponding to the known value of $w$ to be brought opposite a fixed pointer $w$. The arm J, in addition, constitutes a supporting bearing for a screw $J^6$ operated by means of a milled head $j^3$ and the rotation of which determines the displacement of a nut $J^4$ carrying the pointer $j^4$ movable along a generatrix of the drum $J^7$. The nut $J^4$ carries along, by a fork $J^5$, in its longitudinal displacements, the conoidal cam K, along a shaft $K^1$.

To carry out, with the equipment described, firing with the aeroplane flying at an altitude $h$ at a constant speed $v$, and subjected to the action of a wind of known direction and of a likewise known velocity W, it is necessary to proceed as follows:—

Before commencing firing:—

1. The frame D as well as the line of sight is diverted in direction relatively to the longitudinal axis of the aeroplane, through the angle Δ of drift.

2. By means of the mechanism actuated by the hand wheel $f^6$, the cradle F and the gun are displaced about the axis of the trunnions $f$ for the correction in direction $δ^1$.

3. In this second movement, the sighting apparatus G becomes deviated by the amount of the same angle $δ^1$, and it is necessary to restore the axis of the optical objective $g$ parallel to the plane of the course or plane of the longitudinal axis of the frame E, i. e. on the objective. This is effected by the aid of the mechanism shown in detail in Fig. 5, and which comprises a worm sector $G^2$, fast on the support of the sighting apparatus and gearing with a worm $I^3$ journalled in a fork formed on the bar I and adapted to be operated by means of a head $i^3$. By actuating this head, the apparatus G is turned with its pivot $G^1$ in the bar I, through the angle $δ^1$, in order to bring back the axis of the optical objective $g$ into parallelism with the plane of the axis of the frame E, i. e. on the objective.

4. By the aid of the head $H^2$ (Fig. 4) the screw $H^1$ is so actuated as to bring, under the point $G^1$, the desired profile of the conoidal cam H corresponding to the altitude of flight $h$ read on the scale $h^1$. In the longitudinal movement of displacement of the conoidal cam H, the bar I and the sighting apparatus have turned about the supporting point $I^1$ remaining stationary.

5. By operating the milled head $j^2$, the graduation corresponding to the velocity W is brought opposite the pointer $w$; then, by the actuation of the head $j^3$, the pointer $j^4$ is displaced to bring it on to the desired curve of $\varphi$ (its displacement representing W cos $\varphi$).

Thus beneath the point $I^1$ is found to have been brought the desired profile of the conoidal cam K displaced by the fork $J^5$ (Fig. 6).

In this movement, the bar I, carrying along the sighting apparatus G, turns about the point of support of the pointed spindle $G^1$. Finally, in these two last operations, the axis of the objective of the telescope will have been displaced, first through the angle $\beta$ of elevation corresponding to the altitude of flight $h$, then through the angle $\sigma$ corresponding to the correction of elevation compensating for the action of the wind.

It has been seen that the angle $\sigma$ was given by the formula $$\text{sine } \sigma = \frac{W \cos \varphi \cos N}{V^1}.$$

In this expression, W cos $\varphi$ is invariable and $V^1$ can be assumed to be constant; in return, cos N is a function of the position of the objective. It would therefore be convenient, in order to obtain automatically the exact correction $\sigma$ to vary the position of the conoidal cam K as the function of N or the complementary angle, simply by the act of directing the line of sight on the objective.

To this effect, there is provided, between the shaft $K^1$ of the conoidal cam K and the axis of the trunnions $e$ of the frame E, the kinematic connection described above, by means of the spur wheels $K^2$, $K^3$ and the toothed sector $H^4$. For every change of inclination of the gun, there is caused, by virtue of this connection, a proportional displacement of the conoidal cam K about its axis.

In reality, instead of thus displacing the conoidal cam K as a function of the angle N (Fig. 3), it is displaced as a function of the inclination of the gun, i. e. as a function of N+$\beta$. The error thus committed is practically insignificant.

All the preliminary operations described above having been carried out, it suffices for the gun layer, for setting the gun in the desired position, to maintain, by means of the elevating mechanism, actuated by means of the hand wheel T, the line of sight directed on the said objective. The rotation of the gun on its trunnions situated in a plane perpendicular to the plane of the course will approximately give at each angle of laying the desired positions for taking into account the corrections to compensate for the wind and for the speed of the aeroplane.

The arrangement which has just been described comprises, summed up, on the one hand a mounting capable of being diverted in direction, relatively to the axis of the aeroplane, through the angle Δ of drift, the gun being capable moreover of being itself diverted, relatively to the mounting, through the angle of correction; on the other hand, a sighting apparatus which, once its position has been adjusted relatively to the axis of the gun, is maintained on the objective in order that the gun be suitably laid. To this effect, the line of sight is previously diverted by means of two contrivances giving, the one the angle of elevation $\beta$ the other the angle of correction $\sigma$ for the longitudinal action of the wind.

In the first embodiment described, the sighting apparatus is assumed to be displaced as a whole relatively to the axis of the gun for carrying out the operations of laying and correction as functions of $\beta$ and $\sigma$.

It is conceivable that an arrangement based on the same principles could be provided, wherein the preliminary adjustment as a function of $\beta$ and the correction $\sigma$ would be obtained by a deviation of the axis of the objective of the sighting apparatus relatively to a fixed eye piece, i. e. not participating in the movements of inclination of the gun, the objective thus displaceable participating then in the movements of elevation of the gun; the latter would be then set at a suitable angle when the line of sight has been brought on the objective.

This kind of arrangement is shown in Figs. 7 to 14.

In Figs. 8 and 9 it has been assumed for clearness in drawing that the gun has been set horizontally, whereas in reality the arrangement does not provide for an elevation of the gun above the mounting.

The arrangement comprises, as in the example of Figs. 1 to 6, a frame D, movable on rollers $d$ on circular arc rolling tracks $d^1$, about the vertical axis of which frame, can turn, by trunnions $l$, a frame L in which is journalled, in its turn, the cradle F by trunnions $f$, the axis of which is perpendicular to that of the trunnions $l$.

The angular displacement of the frame D, of the gun and of the line of sight (relatively to the longitudinal axis of the aeroplane) is effected by means of the gear $d^4$—$d^5$—$d^6$.

The directional correction $\delta^1$ is imparted to the gun by the rotation of the frame L about the axis of the trunnions $l$, effected by a suitable mechanism, such for example as a worm M journalled in the frame D and gearing with a worm wheel $M^1$ keyed on the frame L. The actuation of the worm is effected by means of the hand wheel $m$.

The mechanism for elevating the gun by rocking the cradle F about the axis of the trunnions $f$, comprises, for example, two sectors $F^1$ carried by the cradle F and which gear with spur wheels $L^1$ carried by a shaft journalled in the frame L, said shaft being actuated by a worm wheel $L^2$ keyed thereon and gearing with a worm $L^3$ adapted to be operated by the aid of a hand wheel $L^4$.

The sighting apparatus G is so fitted to the frame L as to participate as a whole in all the movements of the latter, and is thus subjected, simultaneously with the gun, to the deviations for drift $\delta$ and for the correction $\delta^1$. It is indicated later how the line of sight, actually deviated by $\delta^1$ is, before the commencement of firing, brought back on the objective (situated in the vertical plane of the course).

The apparatus is shown in detail by Figs. 10 to 14 inclusive.

The apparatus comprises a support G, bolted, by a base $G^3$, to one of the longitudinal cheeks of the frame L. The support G is centered by a sleeve $G^4$ in one of the trunnions $f$ of the cradle F (Fig. 11). The tube $G^4$ carrying the eye piece $g^1$ is held stationary in the support G.

In the fixed tube $G^5$, wherein is located a known form of optical arrangement for transmitting the image to the eye piece $g^1$, can move, around the geometrical axis $g^5$, the tube $G^6$ wherein the optical objective is located which is for this purpose carried by a trunnion $g^6$, for which a bearing is formed in the support G. All the deviations imparted to the axis of the gun, relatively to the line of sight, by means of the elevating mechanism, such as the elevation $\beta$ and the correction $\sigma$, will result in relative angular displacements of the axis of $g^6$ and the axis of the gun.

A conoidal cam H, of which the various transverse sections constitute the cams corresponding to the variable values of the altitude of flight $h$, constitutes a nut on a screw $H^1$ journalled in a support $H^5$, which in turn is journalled in the casing G. The conoidal cam is prevented from turning in the support $H^5$, wherein it slides on a bar $h^5$ fast with the said support. In its longitudinal movement, the conoidal cam displaces itself in front of a scale $G^7$, graduated in terms of altitudes $h$, fixed to a window $g^7$ of the casing G; the front shoulder $h^6$ constitutes a pointer. With the support $H^5$ is fast a pinion $H^6$, which gears with a toothed sector N keyed on a shaft $n$ which is socketed, by a squared end, in the trunnion $f$ of the cradle; the shaft $n$ is journalled, by its opposite end, in the casing G. The varied profile of the conoidal cam H acts on a spring-pressed pointed stud $G^1$ feathered in a socket $G^8$, fast with the casing G, and is provided with a rack $G^9$, which gears with a sector $o$, fast with a bevel pinion O mounted loose on a sleeve P which, in its turn, is mounted loose on the shaft $n$. The pinion O gears with a planet wheel $P^1$ in gear with a pinion $N^1$ having the same number of teeth as O and keyed on the shaft $n$, the said planet wheel $P^1$ being carried by the sleeve P. The connection is thence seen which is thus established between the movements of the shaft $n$, and consequently those of the trunnion $f$ of the cradle, and the movements of O $o$, and consequently those of the sector $G^9$ and of the pointed stud $G^1$. Finally, the movements of O $o$ are transmitted, by $P^4$ and P, to a pinion $P^2$, fast on the sleeve P and gearing with a planet wheel $Q^1$ fast on a sleeve Q which moreover carries a sector $Q^2$. This latter gears with an intermediate pinion $Q^3$ formed on a spindle $q^3$ journalled in the casing G, the pinion $Q^3$ gearing in its turn with a pinion $G^8$ fast on a spindle $q^6$. It is thus seen how the transmission is effected of the movements of the pointed stud $G^1$ to the spindle $q^6$, and how, to sum up, by the interposition of the elevation conoidal cam H, the deviation $\beta$ between the axis of the objective of the telescope and the axis of the trunnions $f$ of the cradle, is effected.

A conoidal cam K, the sections of which correspond with the variable values of $$\frac{W \cos \varphi \cos N}{V^1},$$

is longitudinally movable along a screw $J^3$ operated by means of a head $j^3$ and journalled in a support $K^1$, which, in its turn, is journalled in the casing G. The conoidal cam K is prevented from turning, in its movement of translation along the screw $G^3$, by virtue of its guidance on a flat of the support $K^1$ (Figs. 10 and 14). On the stem of the screw $J^3$ is mounted loose a drum $J^2$, on which are traced the curves of $\varphi$ (angle of the direction of the wind with the plane of the course) such that the displacements of a circular pointed $k$ of the conoidal cam K for determined values of W and $\varphi$, represents the value $$\frac{W}{V^1} \cos \varphi.$$

This drum $J^2$ is operated by means of a milled head $j^2$; one end of the drum bears a scale in terms of W, movable in front of a pointer $w$ formed on the casing G.

On the support $K^1$ is formed a pinion $K^4$, which gears with a toothed sector $P^3$ fast with the sleeve P.

From this transmission it results that the pinion $K^4$ makes the support $K^1$ turn and, therefore the conoidal cam K, proportionally to the angular displacements of the pinion $N^1$ and consequently of the trunnion $f$ of the cradle. Owing to the connection of $P^3$ with the planet wheel $P^1$ and of this latter with the pinion O, the pinion $K^4$ likewise receives angular displacements proportional to those of the sector $o$ and of the pointed stud $G^1$.

The conoidal cam K acts on the spring-pressed pointed stud $I^1$ guided in a socket $C^8$ formed on the casing G. This pointed stud carries a rack $I^4$, which gears with a sector $r$ fast with a pinion R, mounted loose on the sleeve P. The pinion R gears with the planet wheel $Q^1$.

It is at once seen that the movements transmitted by the pointed stud $I^1$ to the planet wheel $Q^1$ are picked up by the sector $Q^2$, the pinion $Q^3$ and, in consequence, by the pinion $G^8$, and that thus the movements of the conoidal cam K produce finally a deviation of the spindle $g^6$ proportional to $\sigma$.

Before firing, the frame D (Fig. 8) is deviated through the angle $\Delta$, relatively to the axis I of the aeroplane.

By means of the hand wheel $m$, the frame L is caused to pivot about the axis of the trunnions $l$, through the angle $\delta^1$ which can be read on a graduated sector S (Fig. 8) fixed to the frame D and in front of which rotates a pointer $s$ fast on the trunnion $l$ of the frame L.

In the movement of rotation of the frame L, the support G of the sighting apparatus, as has been mentioned above, is carried along; therefore it is necessary to impart to the axis of the optical objective an inverse deviation, of the same amplitude $\delta^1$. This result is obtained by manipulating the milled head $G^{10}$ which actuates a worm $g^{10}$ and, by this latter, a worm sector $g^{11}$ fast with the reflecting prism $G^{11}$, which receives the beam of light arriving through the optical objective $g$.

It remains, as in the example of Figs. 1 to 6, to adjust the inclination of the gun in order to fire on a determined objective.

For this purpose, as a preliminary, by manipulating the head $H^2$, the circular pointer $h^3$ formed on the conoidal cam H has to be brought opposite the graduation corresponding with the altitude of flight $h$ of the moment.

As has been seen, the pointed stud $G^1$, actuated by the conoidal cam H, in the movement of laying the gun, sets in motion, by the rack $G^9$, the toothed sector $o$ and the pinion O which, in its turn, moves the planet wheel $P^1$ and the sleeve P, the pinion $P^2$, the planet wheel $Q^1$ and, by this latter, the pinions $Q^2$, $Q^3$ and $G^8$, and consequently the spindle $g^6$, which has for its effect the deviation of the prism $G^{11}$ through the angle of elevation $\beta$ relatively to the gun. It is conceivable that when the layer in bringing, by means of the elevating mechanism of the gun, the axis of the eye piece into the desired position in order to enable him to see the objective, will impart to the gun, relatively to the line of sight, determined by the position of the objective prism, the deviation $\beta$ corresponding to the elevation.

As in the example of Figs. 1 to 6, the heads $j^2$, $j^3$ are on the otherhand manipulated in such a manner as to bring successively the desired graduation of the drum $J^2$ opposite the pointer $w$, then the pointer $k$ opposite the desired curve of this drum. The conoidal cam K, in its displacement, acts on the pointed stud $I^1$, which transmits its movement, by the rack $I^4$, the sector $r$, the pinion R, the planet wheel $Q^1$ and the transmission gear $Q^2$, $Q^3$, $G^8$ to the spindle $g^6$ carrying the prism $G^{11}$. The optical objective is thus deviated relatively to the axis of the gun through the above defined correction $\sigma$.

Finally, the layer, having previously effected the adjustment of the position of the two conoidal cams H and K, it will suffice for him to view the objective through the eye piece $g^1$, by manipulating for this purpose the elevating mechanism of the gun, in order that the gun shall have at the instant of firing, the required inclination for the projectile to hit the objective.

Figs. 15 to 17 inclusive illustrate a modification of the construction shown in Figs. 1 to 14, wherein two conoidal cams, the transverse sections of which correspond respectively to the variable values of the angles $\beta$ of elevation and $\sigma$ for correction of the longitudinal action of the wind act upon members the displacements of which are picked up on a spindle fixed to a reflecting prism of the objective of the sighting apparatus, the eye piece and the support of this apparatus being fast on the frame pivoted to the mounting carriage, displaceable on a rolling track of the turret.

Referring to Figs. 15 to 17, F designates the cradle of the mounting, which pivots on trunnions $f$, in a frame (not shown) which, in its turn, can turn, on trunnions, in another frame L, movable on circular arc rolling tracks. $G^x$ designates the sighting apparatus, the support G of which is mounted on the frame L in which the cradle pivots and thus participates in all the movements of such frame, in a manner such as to be subjected simultaneously with the gun, to the deviations corresponding to the drift $\Delta$ and to a correction $\delta$.

The constructional example of Figs. 15 to 17 has for its feature a particular means for transmitting to the reflecting prism $G^{11}$ of the objective of the sighting apparatus, the displacements imparted to the conoidal cams H and K of which the sections correspond respectively to the variable values of the angles $\beta$ of elevation and $\sigma$ of the corrections for the longitudinal action of the wind.

As in the example of Figs. 10 to 14, the support G of the sighting apparatus is fast with the frame L. Within the fixed tube $G^5$, wherein is located a known type of optical contrivance, for conveying the image to the eye piece $g^1$, can move, about the geometrical axis $g^5$, the tube $G^6$ wherein is located the reflecting entry prism $G^{11}$ of the objective, and which carries for this purpose a boss $g^6$ connected to a suitable control, which will be described later. All the deviations imparted to the axis of the gun relatively to the line of sight, by the aid of the elevating mechanism, such as the elevations $\beta$ and the corrections $\sigma$, will result in relative angular displacements of the boss $g^6$ and the axis of the gun.

H is a conoidal cam, of which the various transverse sections constitute cams corresponding with the variable values of the altitude of flight $h$. K is a conoidal cam of which the sections correspond with the variable values $$\frac{W \cos \varphi \cos N}{V^1}.$$

These conoidal cams are here mounted so as to slide, without rotation, along a shaft Y socketed at one extremity by a squared end $y$ in the trunnion $f$ of the cradle, and journalled, at the other extremity $y^1$, in the support G. The conoidal cams H and K are prevented from turning, by virtue of their guidance along a transverse bar $G^{12}$, provided parallel with the shaft Y in the support G. The displacements of the conoidal cam H, in accordance with the variable values of the altitude of flight $h$, are obtained by the actuation of a milled head $H^2$ (Fig. 17), which turns a spindle $h^2$ carrying keyed thereon a pinion $H^3$ which gears with teeth $g^{13}$ formed on the transverse bar $G^{12}$. The rolling of the pinion $H^3$ along the rack $g^{12}$ brings a pointer $h^1$ to the desired value of the graduation for elevation $G^7$ carried by the support G. Likewise, the conoidal cam K, of which the sections correspond with the variable values of $$\frac{W \cos \varphi \cos N}{V^1}$$

is displaceable by means of a milled head $K^1$ (Fig. 16) of which the spindle journals in the conoidal cam, and carries keyed thereon a pinion $k^1$ gearing with a rack $g^{12}$. The displacements of the conoidal cam K are communicated to a pointer $K^2$ which it carries, and which moves in front of a drum $J^2$ journalled in the support G, and on which are traced the curves of $\varphi$ (angle of the direction of the wind with the plane of the course); these curves are such that the displacements of the pointed $K^2$ for determined values of W and of $\varphi$ represent the value $$\frac{W \cos \varphi}{V^1}.$$

The drum $J^2$ is actuated by means of a milled head $j^2$; one end of the drum carries a scale in terms of W, which, in the movements of the drum, moves in front of a pointer $w$ formed on the support G.

The shaft Y is kinematically connected to a trunnion $Y^1$ the geometrical axis of which is in line with that of the boss $g^6$, fast with the reflecting prism of the objective. Such kinematic connection is effected, for example, by a sector $y^2$ fast on the shaft Y, gearing with a pinion $y^3$ moving around a spindle carried by the support G, the pinion $y^3$ gearing, moreover, with a sector $y^4$ mounted loose on the trunnion $Y^1$. The displacement of $Y^1$, by $y^4$ is effected frictionally, by virtue of the bearing, against a collar $y^7$ of the trunnion, of a sleeve $y^5$ thrust by a spring $y^6$.

The trunnions and boss $Y^1$ and $g^6$ are connected by a crank, to the crank pin $Y^2$ to which is pivoted one end $z$ of a connecting rod Z, the other end $z^1$ of which is pivoted to a stem $Z^1$ guided in a socket $Y^3$, fast on the shaft Y. To the stem $Z^1$ is articulated, at its middle at $t$, a rocking beam T $T^1$. To the ends of the arms of this balance are articulated plungers $T^2$ and $T^3$ guided parallel with the stem $Z^1$ in guides formed on brackets on the socket $Y^3$; springs $t^2$, $t^3$ maintain the plungers in contact with the conoidal cams H and K respectively.

The apparatus operates as follows:—

By means of the milled head $H^2$ (Fig. 17), the conoidal cam H is brought to the desired position for the pointer $h^1$ to be opposite the graduation of $G^7$ corresponding with the altitude of flight. Likewise, after having, by means of the milled head $j^2$, brought the desired graduation of W opposite the pointer $w$, the milled head $K^1$ is manipulated so as to bring the pointer $K^2$ of conoidal cam K opposite the curve of $J^2$ corresponding with the desired value of $\varphi$. The displacements imparted to H and K are transmitted respectively to the plungers or roller-carrying fingers $T^2$, $T^3$ and thereby determine the position of the articulation $t$. According to the variable position which this articulation thus receives, the crank pin of the crank will receive a corresponding angular displacement, the plane of the crank thus receiving a variable inclination relatively to the plane of the plungers $T^2$, $T^3$. If now the elevating mechanism is actuated, the movements of the trunnion $f$ of the cradle cause a rotation of the shaft Y, which has the effect of actuating the crank $Y^2$ through the medium of the gearing $y^2$, $y^3$, $y^4$ and the friction of $y^5$ on $y^7$. However, simultaneously, the rotation of the shaft Y entrains, by the socket $Y^3$, the plungers $T^2$, $T^3$ which displace themselves on the profiles of the conoidal cams H and K opposite which they have been set. From this, displacements of the articulation $t$, result; which transmit themselves, by the connecting rod Z, to the crank, and, in consequence, to the boss $g^6$, which carries the entry reflecting prism of the objective.

In all, the entry reflecting prism of the objective receives the angular displacements of the trunnion $f$ of the cradle, corrected in accordance with the position imparted to the plungers $T^2$, $T^3$, i. e. according to the value of $\beta$ (deviation of inclination corresponding with the elevation) and of $\sigma$ corresponding with the longitudinal action of the wind.

Referring to Figs. 18 to 21, the feature of this construction, as in the construction of Figs. 15 to 17, is likewise a particular method of transmitting, to the entry reflecting prism $G^{11}$ of the objective of the sighting apparatus, the displacements imparted to the cams H and K.

The tube $G^6$, in which the entry prism $G^{11}$ of the objective is located, is carried by a socket $g^6$ in which is socketed the hub of a pulley $y^3$, mounted loose on a spindle $G^{13}$, fast on the support G and in prolongation of the geometrical axis $g^5$. A belt $Y^4$ is secured, by one of its ends, to the pulley $Y^5$ mounted loose on a shaft $Y^6$ fast with the trunnion $f$ of the cradle. The belt $Y^4$ is maintained constantly taut by a spiral spring $y^7$ located in a barrel $Y^7$ fast with the pulley $y^3$, one of the ends of the spiral being secured to the barrel and the other anchored to the support G. The pulley $Y^5$ is fast, by a sleeve $Y^8$, with a pulley $Y^9$, to which is secured, by one of its ends, a belt $Y^{10}$, which first enwraps a pulley $T^4$, then a pulley $T^5$, and is secured, by its other end, to a stationary part of the support G. The pulleys $T^4$ and $T^5$ are carried by spindles $t^4$ and $t^5$ respectively journalled in slides guided in stationary guideways $G^{14}$, $G^{15}$ formed in the support G. Springs $t^2$, $t^3$ respectively, by bearing by one end against a fixed abutment and by the other against the spindles $t^4$, $t^5$ respectively, maintain the belt $Y^{10}$ constantly taut. On the spindles $t^4$ and $t^5$ are mounted the rollers $T^2$ and $T^3$ of which one $T^2$ bears against the elevation conoidal cam H, and the other $T^3$ against the conoidal cam K for the wind corrections. The conoidal cams H and K are guided in an extension of the shaft $Y^6$. As shown more particularly by Fig. 21, they turn in consequence with the shaft $Y^6$ when this latter is moved by the trunnion $f$ of the cradle, but can be preliminarily displaced along said shaft, such that any one of their sections, according to the value of $h$ (altitude of flight) on the one hand, and the value $$\frac{W \cos \varphi \cos N}{V^1}$$

on the other hand, is brought in contact with the roller $T^2$ and roller $T^3$ respectively.

The displacement of the conoidal cam H is effected by means of a milled head $H^2$ forming a nut on a screw-threaded stem $H^3$, the head $h^3$ of which is guided in a circular arc slotway $H^4$ formed in the conoidal cam H, and having its centre on the geometrical axis of $Y^6$. By suitably manipulating the milled head $H^2$, the conoidal cam H is thus brought into the desired position in order that the annular head $h^1$ forming the pointer comes opposite the graduation of $G^7$ corresponding with the altitude of flight.

After having, by means of the milled head $j^2$, brought the desired value of W opposite the pointer $w$, a milled head $K^1$ is so manipulated as to bring the pointer $K^2$, held in a circular groove in the conoidal cam K, opposite the curve of $J^2$ corresponding with the desired value of $\varphi$.

The displacements imparted to H and K transmit themselves respectively to the rollers $T^2$ and $T^3$, the spindles of which slide in the support G producing variable rotation of the pulley $Y^9$, according to the degree of retraction or extension to which the belt $Y^{10}$ will have been subjected. If now the elevating mechanism of the gun is manipulated, the movements of the trunnion $f$ of the cradle produce a rotation of the shaft $Y^6$, which has the effect of turning both cams H and K entrained by the extension of the said shaft $Y^6$. The rollers $T^2$, $T^3$ will be found to be displaced by the fact that the cams have rotated, and their rectilinear displacement will produce a variable rotation of the pulley $Y^9$ and consequently the pulley $Y^5$, which will produce a variable angular displacement of the pulley $y^3$ and consequently the reflecting prism $G^{11}$. As in the example of Figs. 15 to 17, the prism $G^{11}$ receives, taking all into account, the angular displacements of the trunnion $f$ of the cradle, corrected in accordance with the positions imparted to the rollers $T^2$ and $T^3$, i. e. in accordance with the value $\beta$ (deviation of inclination corresponding with the elevation) and of $\sigma$ (corresponding to the longitudinal action of the wind).

Claims:

1. In combination with an aeroplane, a platform, a frame rotatable thereon, a gun cradle supported for universal movement in said frame, a gun carried by said cradle, means for elevating the gun, means for training the gun, sighting apparatus for the gun including an optical objective, means for imparting the angular movement of the gun to the sighting apparatus, and means for preliminary angular displacement of said objective relative to the axis of the gun including means for effecting a deviation corresponding to the altitude of the gun, and means for effecting a deviation corresponding to the longitudinal action of the wind.

2. In combination with an aeroplane, a gun, a mounting therefor, sighting apparatus comprising an objective which receives the movements of inclination of the gun, an adjusting mechanism for preliminary angular adjustment of said objective relative to the axis of said gun for the deviation of inclination corresponding with the altitude of the gun, and an adjusting mechanism for preliminary angular adjustment of said objective relative to the axis of said gun for the deviation of inclination corresponding with the longitudinal action of the wind.

3. Sighting apparatus for an aeroplane gun comprising, in combination with a gun and a mount therefor, an optical objective, means for automatically displacing said objective relative to the longitudinal axis of the gun through an angle corresponding to the angle of elevation of the gun, and means for displacing said objective through an angle corresponding with the longitudinal action of the wind.

4. Sighting apparatus for a gun provided with a cradle, an arm operatively connected to said cradle, a member guided by said arm, a support, sighting means operatively secured to said support, means pivotally connecting said support to said member, a camoid engaging said means, the various transverse sections of said camoid corresponding with the variable values of the altitude of flight, means for moving said camoid longitudinally, and a second camoid for introducing windage corrections having operative engagement with said member.

5. In combination with a gun provided with a cradle, guide means operatively connected to said cradle, a bar having engagement with said guide means, a support including a pivot member operatively engaging said bar adjacent one end thereof, sighting means carried by said support, a camoid having engagement with said pivot member, means for moving said camoid longitudinally, a second camoid having engagement with one end of said bar, and means for moving said second camoid longitudinally.

6. In combination, a gun, a mounting therefor, sighting apparatus for the gun including an objective, a camoid for applying altitude corrections, a camoid for applying windage corrections, means for moving said camoids, and means operatively connected to said camoids and said objective for transmitting motion to the latter.

7. Gun laying mechanism comprising, in combination with a gun, means for training and elevating the gun, a sighting telescope having an objective, a camoid, means for adjusting said camoid in accordance with the height from which the gun is to be fired, a second camoid, means for adjusting the second camoid in accordance with the longitudinal action of the wind, and means operatively connected to said camoids and to said objective to deviate the latter in accordance with the adjustment of said camoids.

8. Gun laying mechanism comprising, in combination with a gun, means for training and elevating the gun, a sighting telescope having an objective, a movable member, means for adjusting the movable member in accordance with the height from which the gun is to be fired, a second movable member, means for adjusting said second member in accordance with the action of the wind, and means actuated by said members for deviating said objective.

9. An aeroplane gun mount comprising, in combination with an aeroplane a gun, means for moving said gun through an angle of drift, a sighting telescope having an optical objective, means for moving the gun and said objective through an angle to compensate for the effect of oblique wind, means for moving the optical objective to a position such that the axis of said objective is parallel to the plane of the course of the aeroplane on which the gun is mounted, means for adjusting the objective relative to the longitudinal axis of the gun in accordance with the height from which the gun is to be fired, and means for moving said objective through an angle corresponding to the correction of elevation for the longitudinal action of the wind.

In testimony whereof I have signed this specification.

EUGÈNE SCHNEIDER.